Figure 3:
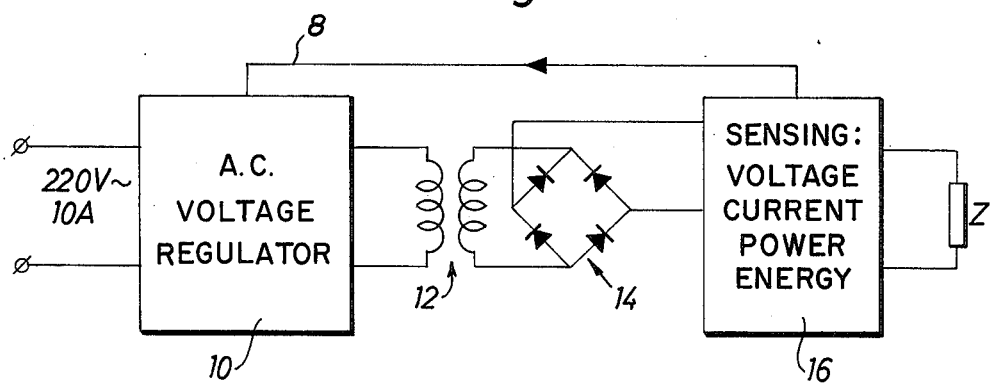

United States Patent [19]
Edstrom et al.

[11] 3,987,357
[45] Oct. 19, 1976

[54] AC VOLTAGE REGULATOR
[75] Inventors: Lennart Edström; Kenth Uddin, both of Lulea, Sweden
[73] Assignee: AB Elektronik-Konstruktioner, Lulea, Sweden
[22] Filed: June 2, 1975
[21] Appl. No.: 582,629

[30] Foreign Application Priority Data
June 7, 1974  Sweden .............................. 7407535

[52] U.S. Cl. ............................... 323/17; 323/22 T; 323/23; 323/24; 323/62
[51] Int. Cl.² .......................................... G05F 1/44
[58] Field of Search ............ 321/9 A; 307/296, 297; 323/6, 7, 17, 22 T, 23, 24, 25, 62

[56] References Cited
UNITED STATES PATENTS

| 3,022,454 | 2/1962 | Millis | 323/23 UX |
| 3,308,373 | 3/1967 | Shaum | 323/25 X |
| 3,372,326 | 3/1968 | Stefanov | 323/24 X |
| 3,593,111 | 7/1971 | Moerlein | 323/22 T |

Primary Examiner—A. D. Pellinen

[57] ABSTRACT

From each of two AC input terminals, separate inductive sections are connected to the opposite sides of a capacitive portion, which in turn is connected to the output terminals. Each inductive section includes a controlled switching device connected in series with an inductive portion and a unidirectional conductive device connected in shunt with the series connected combination of the inductive portion and the switching device, the unidirectional conductive devices being oppositely poled with respect to currents passing from one input terminal to the other input terminal.

4 Claims, 5 Drawing Figures

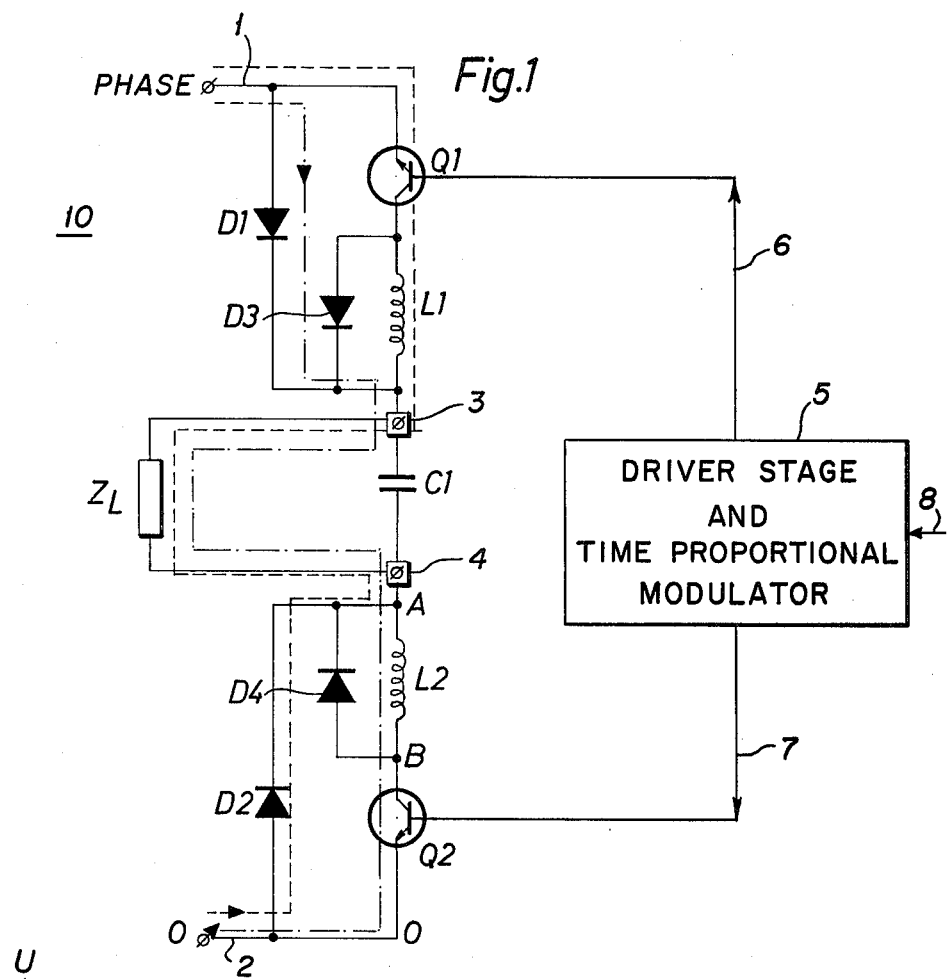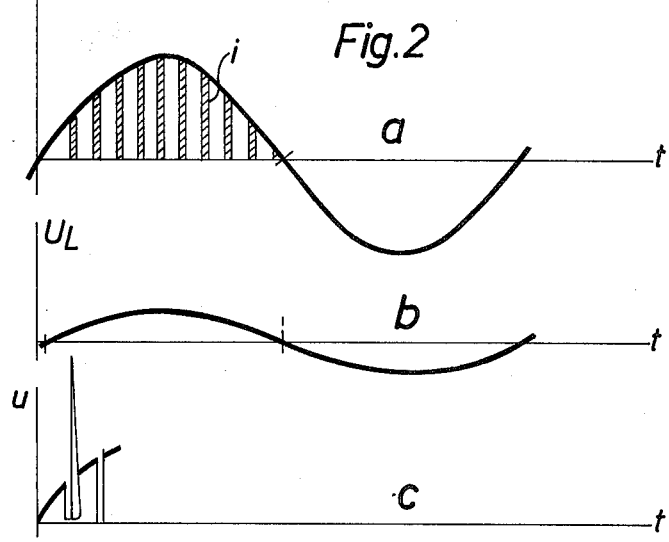

AC VOLTAGE REGULATOR

The present invention relates to an AC voltage regulator comprising a pair of AC supply input terminals, a low-pass filter including a capacitive portion, and a pair of output terminals across said capacitive portion.

Within the electrical arts it is known to produce a sine voltage by pulse width modulating a DC voltage and to obtain an AC voltage signal via a low-pass filter. For larger currents this method requires a relatively expensive AC voltage assembly and causes very large voltage spikes across the inductive portion of the low-pass filter, and thereby also across the switching element, by means of which the DC voltage is pulse width modulated. In order to attain a long life it is further generally desirable to utilize a semi-conductor component as the switching element, which, however, is not possible with presently available semi-conductors. An additional disadvantage is also that the possible output voltage will be a maximum of $U_o/2$, where $U_o$ is the peak value of the supply AC voltage.

By connecting a diode across the inductive portion it is possible to eliminate the above-mentioned voltage spikes, but then the filter will only operate in one direction, i.e., no AC output voltage is obtained. Another problem is that when the switching element is fully saturated, or fails, either the full DC voltage is obtained across the load, or else no voltage at all.

One object of the present invention is to provide an AC voltage regulator, wherein the disadvantages described above are eliminated.

According to the invention the low-pass filter comprises two inductive portions, one on each side of said capacitive portion, said inductive portions being connected to one each of said input terminals via a respective unidirectionally conducting controlled switching device, said switching devices being oppositely poled, each series connection of an inductive portion and an associated switching device having connected thereacross a rectifier device blocking current passing in the conducting direction of the associated switching device but conducting current passing through the other switching device.

Preferably each of the inductive portions has connected thereacross a further rectifier device blocking current passing in the conducting direction of the switching device located at the same side of the filter, but conducting as a result of induced voltage occurring when a current through the respective inductive portion is interrupted by the last mentioned switching device.

The regulator operates principally as an auto-transformer with a pure sine voltage at the output, from 0 volts to full output voltage. The output voltage can be regulated at the control input of the switching devices by means of a potentiometer, or a voltage or current signal.

The following advantages are obtained:

1. The regulator can be driven directly from the main AC voltage without any intermediate DC voltage assembly.

2. By dividing the inductance of the low-pass filter into two portions in the manner described, the large inductive voltage spikes are attenuated for each half-cycle.

3. By driving with an AC voltage, the modulator, the output signals of which control the switching devices, will be much simpler, since only amplitude modulation and not frequency modulation need be performed, contrary to assemblies based on the known principle described above.

4. Upon full saturation, the switching devices are fully conducting, which eliminates switching losses. In the prior method, the maximum degree of modulation would have occurred in this situation and therewith the maximum losses.

The invention will now be described more closely below with reference to the attached drawings, on which FIG. 1 is a simplified connection diagram of the fundamental portion of the regulator according to the invention.

FIG. 2 shows current and voltage curves in order to illustrate more closely the operation of the circuit according to FIG. 1.

Figure 4:
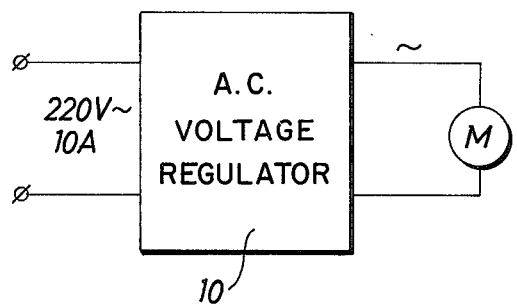
Figure 5:
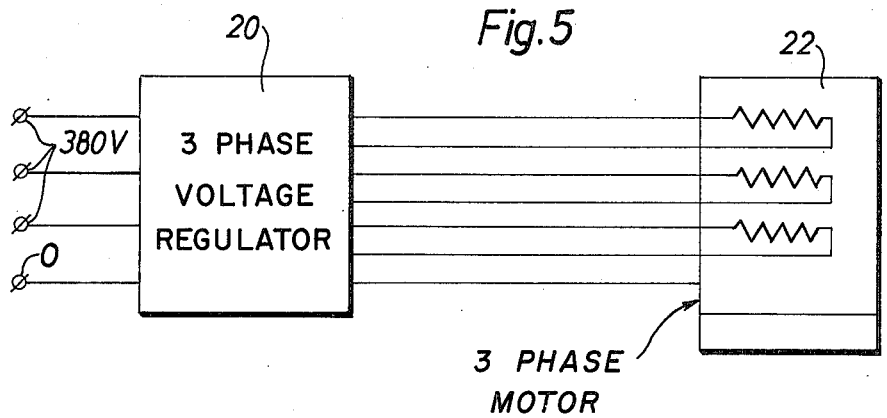

And FIGS. 3 through 5 schematically indicate three examples of the utilization of the regulator according to the invention.

In FIG. 1, the regulator is designated as a whole as 10. The input terminals 1 and 2 of the circuit shown have been given the references "phase" and "O", respectively. These input terminals are supplied directly by an AC voltage, e.g., the supply voltage. The circuit comprises a low-pass filter, consisting of a capacitance C1, to which a load $Z_L$ is connected at output terminals 3 and 4, and on either side of this capacitance two inductances L1 and L2, respectively. The inductances L1 and L2 are supplied directly from the respective input terminals, via unidirectionally conducting, controllable switching devices Q1 and Q2, respectively. Q1 and Q2 consist of convenient semi-conductor devices, e.g., transistors. The switching devices have mutually opposite conducting directions. Across each inductance L1 and L2 a diode D3 and D4, respectively, is connected to block current flowing through the corresponding switching device Q1 and Q2, respectively but to conduct for voltage induced when the current through the associated inductance is interrupted. In place of diodes other voltage responsive resistors may be used. Across the respective series connection of an inductance L1, L2 and a switching device Q1 and Q2, respectively, an additional diode D1 and D2, respectively, is provided, which blocks current in the conducting direction of the corresponding switching device Q1 and Q2, respectively, but conducts full current through the other switching device.

When the switching devices Q1 and Q2 are controlled by a conveniently modulated signal from the driver stage and modulator 5, so that they are maintained conducting or non-conducting in relation to a desirable output voltage, current pulses are obtained through the switching devices and these pulses are integrated by the low-pass filter C1, L1, L2. Thereby a sine voltage is obtained across the capacitance C1 of the low-pass filter at a conveniently selected frequency of the current pulses. Connections to driver stage and modulator 5 have been indicated by the lines 6 and 7 extending from the control terminals of the two switching devices Q1 and Q2.

The manner of operation described above is illustrated more closely in FIG. 1 in combination with the voltage and current curves shown in FIG. 2. Thus, in FIG. 1 the current path through the circuit, when the supply AC voltage is positive, has been indicated by a dash-dot line, and at a negative voltage by a broken line. In FIG. 2a the supply AC voltage is shown by the full line curve and in the positive portion thereof the current pulses through Q2 are inserted in the form of dash-line rectangles i. The current pulses through Q1 obtain the corresponding shape during the negative portion of the supply AC voltage. The current pulses through Q1 and Q2 are integrated, as mentioned above, in the low-pass filter, the result being as indicated in FIG. 2b, wherein the voltage across C1 is shown.

The operation of the diodes D3 and D4 is illustrated in FIG. 2c, wherein a portion of the voltage across Q2 has been shown for two cases, viz., one with, and one without, the diode D4. Without the diode the first, long voltage spike is obtained, which, however, has been removed with the diode D4, as has been indicated by the second, short voltage spike.

By the use of the devices Q1 and Q2, which can be switched on and off rapidly, the R.M.S. value of the output voltage can be influenced during the half-cycle of the supply AC voltage. The pulse width modulator utilized for the control of Q1 and Q2 may be of a conventional type. Briefly, it operates in such a manner that the level of an input DC voltage to the modulator at 8 controls the pulse width of the output pulses intended for controlling Q1 and Q2.

If the modulator is supplied with a voltage, the amplitude of which varies with time, e.g., in sine-shape, an output voltage train is obtained, in which the pulse width varies in a corresponding manner. By the use of such a modulator a frequency can be superimposed on the supply frequency, which is lower than the supply frequency. One switching device is blocked for a certain time so as to only provide the positive half-cycles, the sum of which is integrated in the low-pass filter, which should then have a very low cut-off frequency. Thereafter the second switching device is blocked so as to provide only negative half-cycles to the low-pass filter and thereby to the load. In this manner it is possible to obtain an output voltage with a variable frequency. The blocking of the respective switching device is performed in the modulator in a manner well known per se to a person skilled in the art. If the method described above is combined with the arrangement that the supply AC voltage is supplied to the regulator via thyristor converters so that both half-cycles of the input AC voltage are used to build up the respective output voltage half-cycle, an improved power efficiency and pulse shape is obtained.

The capacitance C1 is sometimes referred to below as "a capacitive portion" and the inductances L1 and L2 are sometimes referred to below as "inductive portions". Furthermore, the combination of the uni-directionally conductive controllable switching device, such as Q1, and the associated inductance, such as L1, is sometimes collectively referred to as an inductive section.

In FIG. 3 through FIG. 5 a few examples are given of the ranges of application of the AC voltage regulator according to the invention.

In FIG. 3 it is thus included in a controlled power rectifier, where the regulator block indicated 10, comprising a convenient modulator, is connected between the supply voltage and the primary side of a transformer 12, the secondary side of which supplies a rectifier bridge 14, to which a load Z is connected. At the output of the rectifier bridge 14 a control signal is obtained by sensing voltage, current, power or energy, as indicated by the block 16. This control signal is used to control the modulator in the block 10.

In FIG. 4 speed control of a single-phase motor or an AC brake is schematically illustrated and in FIG. 5 a three-phase motor with voltage control and soft start is illustrated. In FIG. 4, 10 indicates the regulator of the invention with the associated modulator. In FIG. 5 the regulator block 20 comprises three circuits according to FIG. 1, the inputs of which are connected to one phase winding each of the motor indicated by the block 22. The three regulators are operated principally from a common modulator with an intermediate insulating stage.

The closer connection details in the three exemplary embodiments according to FIG. 3 through FIG. 5 are evident to a person skilled in the art and do not form any part of the present invention, and thus need not be described more closely here.

I claim:
1. A combined AC voltage regulator and low-pass filter comprising
   a pair of output terminals,
   a capacitive portion connected across said output terminals,
   a pair of AC supply input terminals,
   separate inductive sections connected respectively from said input terminals to the opposite sides of said capacitive portion,
   each inductive section including an inductive portion and a uni-directionally conductive controllable switching device connected in series,
   said switching devices being oppositely poled with respect to currents passing from one input terminal to the other input terminal,
   and each inductive section including a unidirectional conductive device connected in shunt with the series connected combination of said inductive portion and said switching device and oppositely poled with respect to said switching device to block current in the conducting direction of the associated switching device but to conduct current passing through the switching device associated with the other inductive section.

2. A regulator as claimed in claim 1 wherein each of said inductive sections includes another unidirectional conductive device connected across said inductive portion and poled to block current passing in the conducting direction of said switching device but operable to conduct a current resulting from an induced voltage occurring when the current through the associated inductive portion is interrupted by said switching device.

3. A regulator as claimed in claim 1 wherein said switching devices are connected for control by a pulse width modulator,
   the output signal of said pulse width modulator being applied to said switching devices to present a time controllable pulse width.

4. A regulator as claimed in claim 1 wherein said switching devices comprise transistors and wherein said unidirectional conductive devices comprise rectifiers.

* * * * *